US006092279A

United States Patent [19]

Shoup

[11] Patent Number: 6,092,279

[45] Date of Patent: *Jul. 25, 2000

[54] BEARING PULLER

[76] Inventor: Kenneth E. Shoup, P.O. Box 121, Bonfield, Ill. 60913

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,050

[22] Filed: Jul. 9, 1997

[51] Int. Cl.[7] .......... B23P 15/00

[52] U.S. Cl. .......... 29/724; 29/426.5; 29/264; 29/265; 29/259

[58] Field of Search .......... 29/724, 898.08, 29/426.5, 253, 256, 258, 259, 263, 265, 264

[56] References Cited

U.S. PATENT DOCUMENTS

| | | | |
|---|---|---|---|
| 1,171,590 | 2/1916 | Campbell . | |
| 1,355,028 | 10/1920 | Blessing et al. . | |
| 1,357,698 | 11/1920 | Fessenden . | |
| 1,367,016 | 2/1921 | Campbell . | |
| 1,435,278 | 11/1922 | Campbell . | |
| 1,831,003 | 11/1931 | Holland . | |
| 2,050,005 | 8/1936 | Heegeman | 29/35 |
| 2,305,076 | 12/1942 | Graham | 29/88.2 |
| 2,352,739 | 7/1944 | Sauer | 29/85 |
| 2,496,005 | 1/1950 | Grant | 29/283 |
| 3,008,226 | 11/1961 | Kellerman | 29/201 |
| 3,408,724 | 11/1968 | Hoeijenbos | 29/263 |
| 3,605,242 | 9/1971 | Kuffner | 29/263 |
| 3,763,539 | 10/1973 | Dodd | 29/201 |
| 4,059,883 | 11/1977 | Osborne | 279/42 |
| 4,852,235 | 8/1989 | Trease et al. | 29/263 |
| 4,977,661 | 12/1990 | Wood | 29/261 |
| 5,228,180 | 7/1993 | Bauer et al. | 29/263 |
| 5,255,435 | 10/1993 | Shultz | 29/898 |
| 5,333,378 | 8/1994 | Sjobom | 29/898 |

*Primary Examiner*—P. W. Echols
*Assistant Examiner*—Marc W. Butler
*Attorney, Agent, or Firm*—Emrich & Dithmar

[57] ABSTRACT

A bearing puller for removing from a shaft a bearing having a tapered eccentric flange on its inner race includes a cylindrical tube disposed within an outer cylindrical housing. The puller tube is capable of sliding displacement within and along a portion of the length of the outer housing and includes a first end having outer threads for engaging and maintaining a puller nut on a first end of the housing. The puller nut includes a threaded aperture on an end thereof for receiving a draw bolt which is inserted in the housing and extends to a second opposed end thereof. A second end of the sliding puller tube includes a peripheral flange for engaging first and second paired split jaw members each having a respective inner tapered flange on a distal end thereof for engaging the tapered flange on the bearing's inner race. With the two split jaws engaging the bearing's inner race, the outer housing is slid over the puller tube so as to cover the split jaws which are thereby maintained in secure engagement with the inner race's tapered flange. An end of the draw bolt is placed in contact with an end of the shaft and is tightened, moving the outer housing, puller tube and pair of split jaws along the longitudinal axis of and away from the shaft and removing the bearing from the shaft.

13 Claims, 3 Drawing Sheets

BEARING PULLER

FIELD OF THE INVENTION

This invention relates generally to apparatus for removing a bearing from a shaft and is particularly directed to a bearing puller which engages the bearing's inner race with a pair of semi-cylindrical jaw members and removes the bearing by applying a pulling force equally distributed over both jaw members and uniformly applied about the entire circumference of the bearing's inner race.

BACKGROUND OF THE INVENTION

Ball bearings are typically used in mechanical devices to transfer sliding friction into rolling friction for reducing the amount of friction that might otherwise occur between moving parts. A common application, and one in which the present invention is intended for use, involves positioning a ball bearing on a rotating shaft which is mounted to a fixed support structure such as a structural panel through which the shaft extends. Such applications are common in heavy machinery such as agricultural machines and construction equipment.

The ball bearing assembly generally includes an outer race and an inner race and a plurality of ball elements disposed between and engaging the inner and outer races to permit free rotation between the races. The bearing races are typically press-fit into securing engagement with adjacent structure making it very difficult to remove the bearing such as for servicing or replacement. Bearings so installed typically are removed by prying the bearing from its housing and from the shaft on which it is positioned by the application of considerable force. This frequently results in damage to the bearing and/or to the surrounding structure. It may also be necessary to cut or break the bearing assembly apart in order to separately extract the various bearing components from its housing and shaft. Bearing removal thus frequently results in damage or destruction to the bearing as well as to the surrounding structure and is labor intensive and time consuming and thus expensive. Moreover, an asymmetrical force is typically applied to the bearing during removal, increasing the likelihood of damage to the bearing and rendering bearing extraction even more difficult. Finally, prior art bearing pullers are generally limited to use with bearings having a given diameter. Examples of bearing pullers can be found in U.S. Pat. Nos. 1,171,590; 1,367,016; 2,050,005; and 5,255,435. U.S. Pat. No. 4,059,883 is an example of a prior art puller such as for an ignition lock.

The present invention represents an improvement over the prior art by providing a bearing puller of simplified design and operation which engages and applies a symmetrical force either to a tapered eccentric flange extending from the bearing's inner race or to the ball groove on the bearing's inner race for removing the bearing from a shaft.

OBJECTS AND SUMMARY OF THE INVENTION

Accordingly, it is an object of the present invention to provide apparatus for removing from a shaft variously sized bearings, i.e., of English or metric dimensions, as well as bearings having a wide range of diameters.

It is another object of the present invention to provide a bearing puller for removing the inner race of the bearing from a shaft by engaging either the inner race's tapered end flange or its peripheral ball groove.

Yet another object of the present invention is to provide a high strength bearing puller of simplified construction which is easy to use, reliable in operation, and is particularly adapted for use with large machinery such as agricultural machines and construction equipment.

This invention contemplates a bearing puller for removing a bearing from a shaft, wherein the bearing includes an outer race and an inner race disposed on the shaft, the bearing puller comprising: an outer cylindrical hollow housing having first and second opposed, open ends; an inner cylindrical hollow puller tube slidably disposed within the housing and moveable along a portion of the length of the housing, the puller tube including first and second opposed, open ends; first and second semi-cylindrical jaw members engaging the inner race of the bearing and coupled to the first end of the puller tube and disposed at least partially within and engaging a first end of the housing; a tightening mechanism coupled to the puller tube and engaging the second end of the housing for displacing the puller tube and jaw members toward the second end of the housing and urging the jaw members inwardly toward one another and in secure engagement with the bearing's inner race; and a puller device coupled to the tightening mechanism and engaging an end of the shaft for urging the hollow housing, puller tube and jaw members along the longitudinal axis and toward the end of the shaft for removing the bearing from the shaft.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
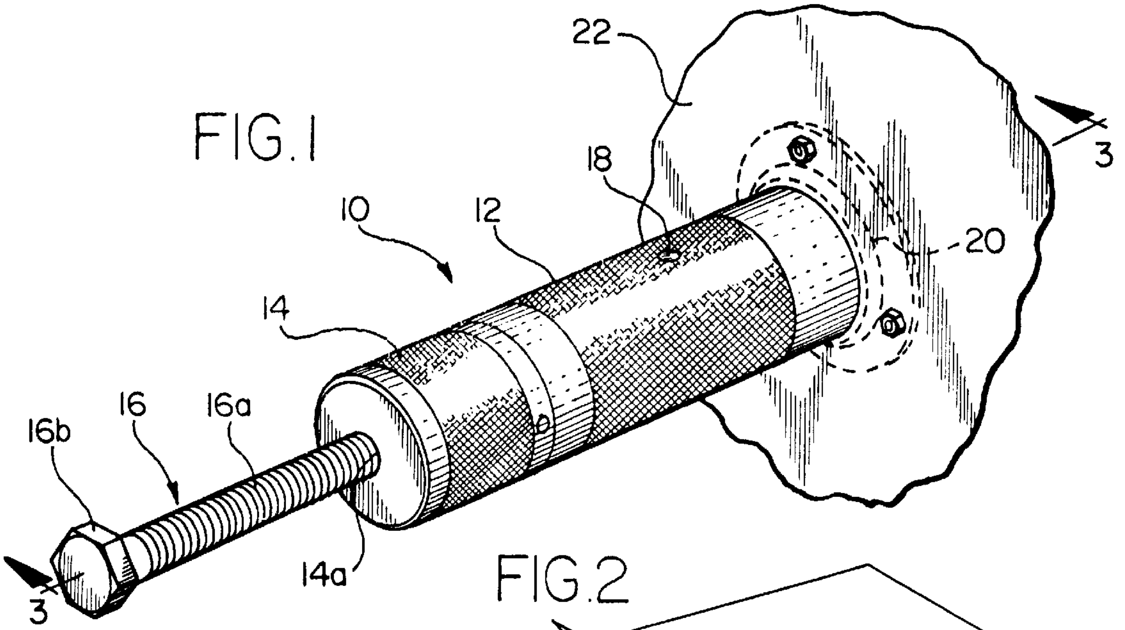
FIG. 1 is a perspective view of a bearing puller in accordance with the present invention shown in position on a bearing disposed in a flat panel-mounted housing.
Figure 2:
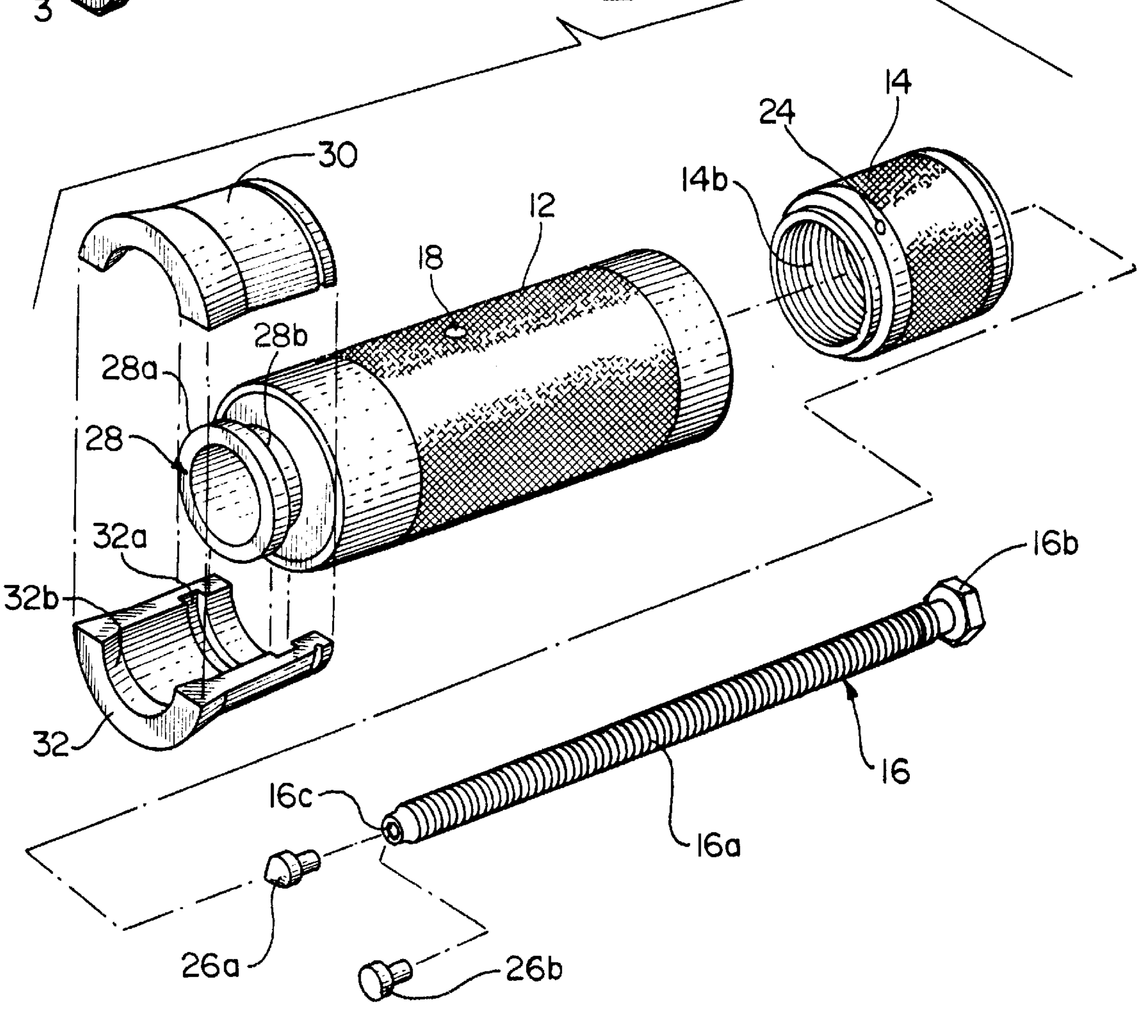
FIG. 2 is an exploded perspective view of the bearing puller of the present invention shown in FIG. 1.
Figures 3, 4:
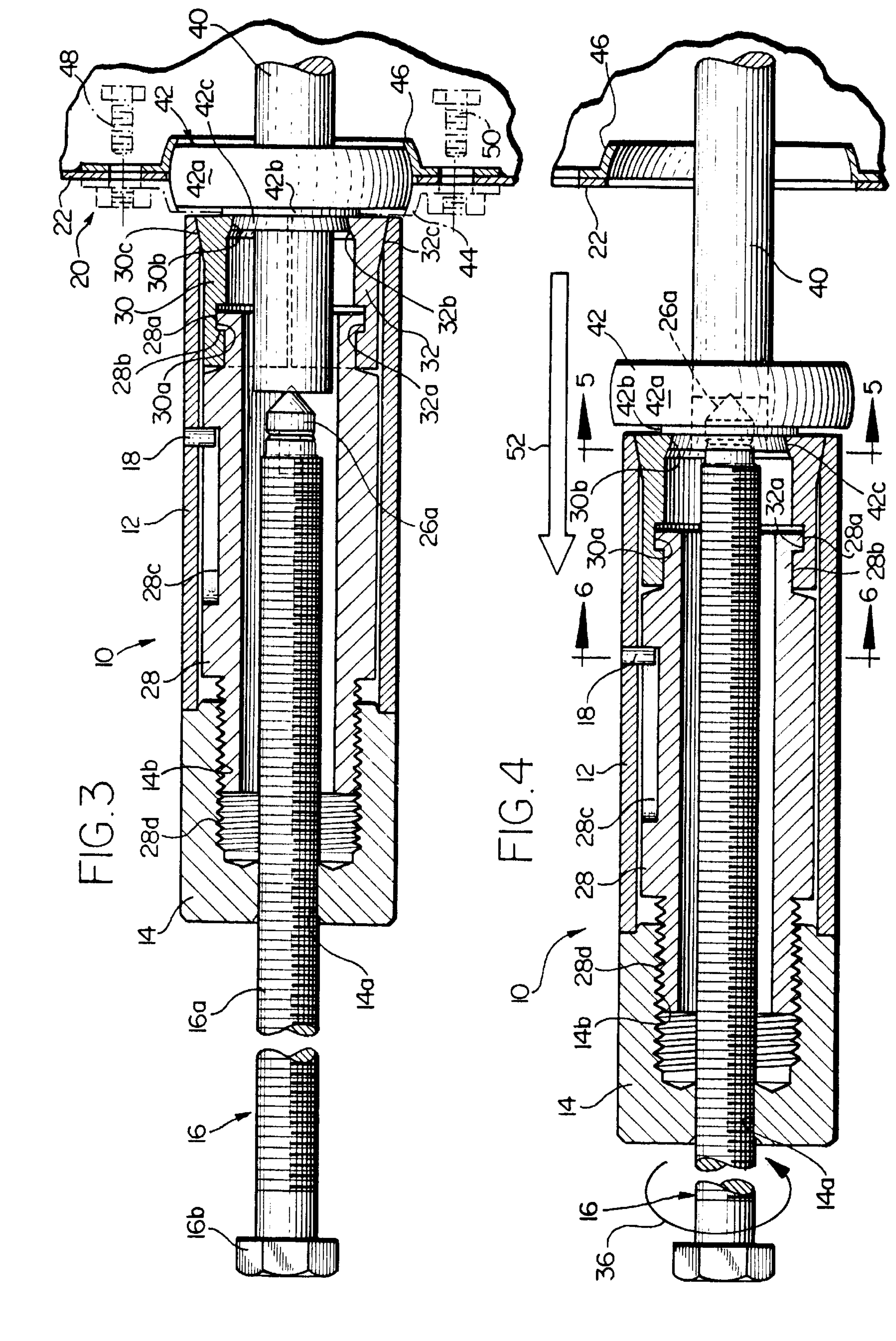
FIG. 3 is a longitudinal sectional view of the bearing puller shown in FIG. 1 taken along site line 3—3 therein.
FIG. 4 is a lateral section view of the bearing puller of the present invention showing the manner in which a bearing is engaged and removed from a shaft and associated housing by the bearing puller.
Figure 6:
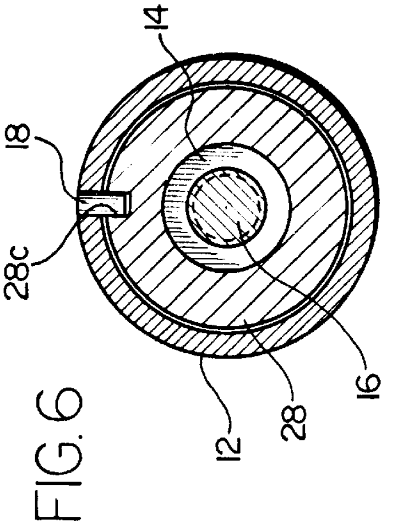
FIGS. 5 and 6 are sectional views of the bearing puller shown in the sectional view of FIG. 4 taken respectively along site lines 5—5 and 6—6 therein.
Figure 5:
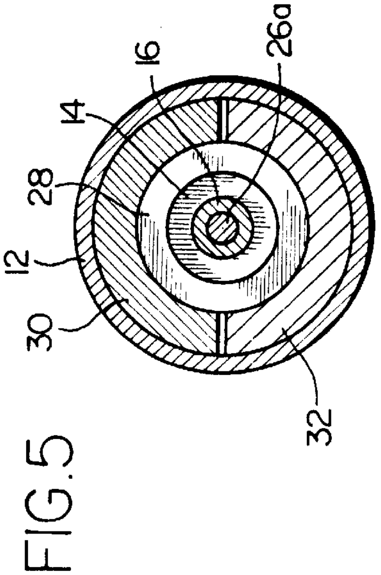

Referring to FIG. 1, there is shown a perspective view of a bearing puller 10 in accordance with the present invention for removing a sealed bearing 20 attached to a retaining body 22, such as a structural panel or housing. An exploded perspective view of the inventive bearing puller 10 is shown in FIG. 2, while a longitudinal sectional view of the bearing puller shown in FIG. 1 taken along site line 3—3 therein is shown in FIG. 3. FIG. 4 is a longitudinal sectional view of the bearing puller 10 showing removal of a bearing 42 from a shaft 40 on which it is disposed. Finally, sectional views of the bearing puller 10 shown in FIG. 4 respectively taken along site lines 5—5 and 6—6 therein are shown in FIGS. 5 and 6.

Bearing puller 10 includes an outer cylindrical, hollow housing 12 open at both ends and having a knurled outer surface to facilitate gripping. Disposed within puller housing 10 is a cylindrical puller tube 28 which is freely slidable within and along a portion of the length of the puller housing. Puller tube 28 is also open at both ends. A first end of puller tube 28 is provided with a combination of an end flange 28*a* and a recessed groove 28*b* disposed immediately adjacent to and proximal from the aforementioned end flange. Disposed on a second opposed end of the puller tube 28 is an outer threaded portion 28*d* as shown in FIGS. 3 and 4. The outer threaded portion 28*d* of puller tube 28 is adapted to receive and engage the inner threaded portion 14*b* of a puller nut 14. With the inner threaded portion 14*b* of puller nut 14 engaging the outer threaded portion 28*d* of puller tube 28, the puller nut is disposed in intimate contact with an end of the puller housing 12 as shown in FIGS. 1, 3 and 4. Puller nut 14 is also generally cylindrical in shape and includes a threaded aperture 14*a* in an end thereof. Inserted through and engaging the threaded aperture 14*a* in puller nut 14 is a draw bolt 16 which includes a threaded portion 16*a* and a hex end 16*b*. Draw bolt 16 is inserted through aperture 14*a* in puller nut 14 and is tightened so as to extend within and through a substantial portion of the puller tube 28 as shown in FIG. 3. Disposed on a second end of draw bolt 16 is a pointed replaceable tip 26*a* as shown in FIG. 3 which engages an end of a shaft 40 from which a bearing 42 is to be removed by the bearing puller 10 of the present invention. As shown in FIG. 2, a flat replaceable tip 26*b* may also be attached to the second end of the draw bolt 16 by inserting it in an end slot 16*c* in the draw bolt. Puller nut 14 also includes a knurled outer surface similar to that of the puller housing 12 to facilitate manual gripping of the bearing puller 10. Puller nut 14 is also provided with a drill hole 24 in an outer portion thereof for receiving a punch (not shown for simplicity) to facilitate tightening the puller nut.

Extending into and disposed in an aperture in a lateral portion of puller housing 12 is a guide pin, or key, 18. Guide pin 18 extends through the aperture in the puller housing 12 and into an elongated, linear slot 28*c* disposed in a lateral portion of the puller tube 28. Guide pin 18 allows puller tube 28 to slide within and along a portion of the length of the puller housing 12 a limited distance, which distance is equal to the length of slot 28*c*. This permits the first end of the puller housing 12 to be positioned in contact with the first and second half jaws 30, 32 while the two half jaws remain securely attached to the first end of puller tube 28. Guide pin 18 also prevents rotational displacement between the inner puller tube 28 and the outer puller housing 12. Guide pin 18 is also shown extending through the puller housing 12 and into the linear, longitudinal slot 28*c* in the puller tube 28 in the sectional view of FIG. 6.

As shown in FIGS. 3 and 4, shaft 40 extends through structural panel 22. A bearing 42 of the conventional type having an outer bearing race 42*a* and an inner bearing race 42*b* is disposed on shaft 40. The inner and outer bearing races 42*b*, 42*a* are concentrically disposed and freely rotatable relative to one another and permit shaft 40 to rotate relative to the fixed structural panel 22. Extending from a lateral portion of the inner bearing race 42*b* is a tapered, eccentric inner bearing flange 42*c*. Inner bearing flange 42*c* is used in combination with a collar (not shown for simplicity) disposed about the inner bearing flange and shaft 40 for securely connecting the inner bearing race 42*b* to the shaft and preventing rotation therebetween. Bearing 42 is disposed within first and second bearing housing members 44 and 46 which are mounted to the structural panel 22 by conventional means such as bolts 48 and 50. The first bearing housing member 44 must be removed before bearing 42 can be removed from shaft 40 by the bearing puller 10 of the present invention as described below.

The inventive bearing puller 10 further includes a split jaw arrangement including first and second half jaws 30 and 32. The first half jaw 30 includes an inner recessed groove 30*a* and an inner tapered flange 30*b* on an end thereof. Similarly, the second half jaw 32 includes an inner recessed groove 32*a* and an inner tapered flange 32*b* on an end thereof. Each of the half jaws is generally semi-cylindrical in shape and is adapted for tight fitting positioning on an end of puller tube 28. Thus, the inner recessed grooves 30*a*, 32*a* of the first and second half jaws 30, 32 are adapted for tight fitting positioning about the end flange 28*a* of puller tube 28.

Bearing puller 10 is used in the following manner in removing bearing 42 from shaft 40. The inner tapered flanges 30*b* and 32*b* of the first and second half jaws 30, 32 are positioned in engagement with the tapered, eccentric end flange 42*c* of bearing 42. The recessed grooves 30*a* and 32*a* of the first and second half jaws 30, 32 are also placed in tight fitting engagement with the end flange 28*a* of puller tube 28. Puller housing 28 is then slid in a rightward direction as viewed in FIG. 3 over the first and second half jaws 30, 32 so as to engage the half jaws and maintain the half jaws in secure engagement with the eccentric, tapered end flange 42*c* of bearing 42. The first and second half jaws 30, 32 further include respective tapered outer surfaces 30*c* and 32*c* which engage a tapered, inner portion on the end of the puller housing 12. Complementary tapered engaging surfaces of the puller housing 12 and the first and second half jaws 30, 32 provide intimate contact between the puller housing and half jaws to ensure that the half jaws remain in secure, tight fitting engagement with the bearing's eccentric, tapered end flange 42*c*.

In removing bearing 42 from shaft 40, the first and second half jaws 30, 32 are positioned in intimate contact with the bearing's end flange 42*c* and are further disposed within the end of puller housing 12. Draw bolt 16 is positioned within puller housing 12 by threadably inserting it through aperture 14*a* in puller nut 14 which is attached to the puller tube 28 as previously described. Pointed replaceable tip 26*a* attached to the end of draw bolt 16 is positioned in contact with the end of shaft 40 and draw bolt is tightened by means of its hex end 16*b* using conventional means such as a wrench. As draw bolt 16 is tightened, or rotated in the direction of arrow 36 shown in FIG. 4, the combination of puller housing 12 and puller tube 28, as well as the first and second half jaws 30, 32 disposed therebetween, are displaced leftward as viewed in FIG. 4 in the direction of arrow 52. With the first and second half jaws 30, 32 securely engaging the bearing's tapered, eccentric end flange 42*c*, bearing 42 is similarly displaced in the direction of arrow 52 and is withdrawn from the end of shaft 42 by bearing puller 10. The first and second half jaws 30, 32 engage the entire periphery of the bearing end flange 42*c* in applying a pulling force on the bearing 42 which is equally distributed circumferentially around the jaws and about the bearing's end flange. Variously sized bearings having a wide range of inner race end flange dimensions may be removed from shaft 40 by the bearing puller 10 of the present invention by merely using half jaws with an opening which matches the outer diameter of the bearing's end flange. Half jaw pairs having a wide range of inner diameters may be used in the present invention to accommodate a wide range of bearing sizes. As shown in FIG. 4, the combination of puller housing 12, puller tube 28 and first and second half jaws 30, 32 pull bearing 42 in the direction of arrow 52 until the bearing is removed from the end of shaft 40. This combination is displaced leftward in the direction of arrow 52 until bearing 42 is removed from shaft 40.

Figure 7:
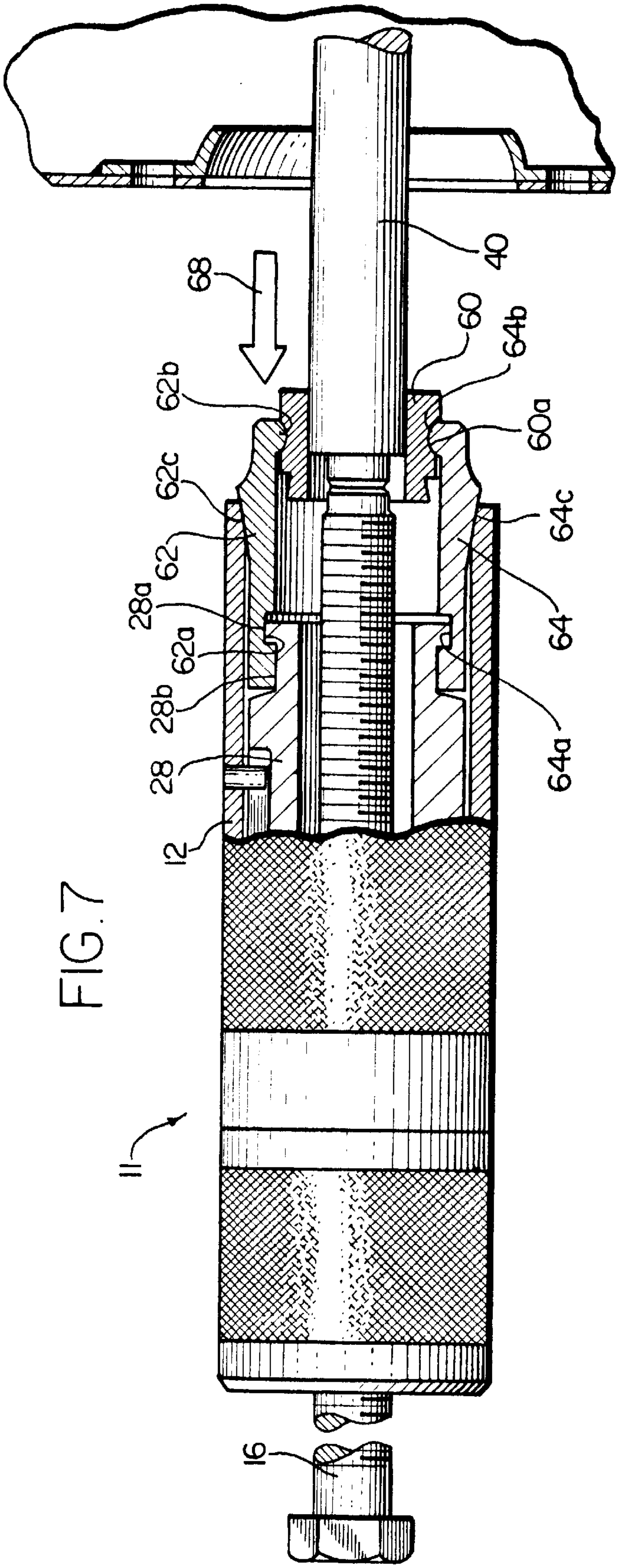
FIG. 7 is a side elevation view shown partially cut away of the embodiment of the bearing puller of the present invention which engages the ball groove of the bearing's inner race for removing the bearing from a shaft.

Referring to FIG. 7, there is shown another embodiment of a bearing puller 11 in accordance with the principles of the present invention. Common identifying numbers are used for the same elements in bearing pullers 10 and 11. Bearing puller 11 is used where the bearing inner race 60 is fixedly attached to shaft 40 such as by corrosion. The outer bearing race is first removed from the bearing which is easily accomplished if the ball bearings are damaged or destroyed. The bearing's outer race is not shown in FIG. 7 for simplicity. If the ball bearings are present, then the bearing's self-aligning outer race must be cracked, such as by means of a hammer. The bearing's outer race is then removed, permitting bearing puller 11 to remove the bearing's inner race 60 as described in the following paragraph.

Bearing puller 11 includes first and second half-ball race jaws 62 and 64. Each of the ball race jaws 62, 64 is semi-cylindrical in shape as in the previously described embodiment. The first half-ball race jaw 62 includes an inner recessed groove 62*a*, while the second half-ball race jaw 64 also includes an inner recessed groove 64*a*. Each of the recessed grooves 62*a* and 64*a* is adapted to receive in tight fitting engagement the end flange 28*a* of the puller tube 28. The first half-ball race jaw 62 includes a tapered outer surface 62*c*, while the second half-ball race jaw 64 similarly includes a tapered outer surface 64*c*. Each of these outer surfaces 62*c* and 64*c* of the half-ball race jaws engages an inner tapered surface on the end of the puller housing 12. Each of the first and second half-ball race jaws 62, 64 further includes a respective inner flange 62*b* and 64*b*. Each of the inner flanges 62*b*, 64*b* is adapted for positioning in and engaging the inner ball race, or groove, 60*a* of the bearing's inner race 60 as shown in FIG. 7. Rotation of the draw bolt 16 as previously described causes the combination of puller housing 12, puller tube 28, and the first and second half-ball race jaws 62, 64 to be displaced in the direction of arrow 68. With the first and second half-ball race jaws 62, 64 securely engaging the inner ball groove 60*a* of the bearing's inner race 60, the inner race is pulled by the bearing puller 11 in the direction of arrow 68 and is removed from shaft 40.

The bearing puller is used in the following manner. The shaft on which the bearing is positioned is cleaned of rust, dings and dents such as by using an emery cloth. If the end of the shaft is mushroomed, filing or grinding the end portion of the shaft down to size may be required. The shaft is then lubricated with a rust solvent or a penetrating oil and the cam lock is removed from the bearing. A punch and a hammer are used to drive the bearing back on the shaft so as to loosen the rust film between the shaft and the bearing, which procedure may be necessary to repeat several times in removing the bearing from the shaft. One-half of the split jaw is then set onto the main puller and is positioned on the bearing's cam lock lip. The other one-half jaw member is then positioned on the cam lock lip and the outer puller housing is slid over the two half jaw members to hold the split jaws together. The puller nut is then screwed onto the end of the inner puller tube and tightened. The draw bolt must be clear from the end of the shaft so that the puller nut can be tightened. The puller nut includes a drill hole in a lateral portion thereof which is designed for a punch to tighten the nut on the puller tube. The puller nut must not be over-tightened as this will compress the bearing to the shaft, making it more difficult to remove the bearing from the shaft. The hex end of the draw bolt is adapted to receive a 1⅛" socket which may be coupled to a ½" drive ratchet to screw the draw bolt up tight in removing the bearing from the shaft. An air wrench or hammer should not be used to tighten the draw bolt as this may damage the bearing puller. To pull a bearing using its inner ball groove on its inner race, the outer bearing race must be broken from the bearing hub to permit removal of the ball bearings. The half ball race jaws are then positioned in the inner groove of the ball bearing race and the draw bolt is tightened to remove the bearing's inner race from the shaft as previously described.

There has thus been shown a bearing puller for removing a bearing having a tapered, eccentric flange on its inner race from a shaft. The bearing puller includes an inner cylindrical puller tube disposed within an outer cylindrical puller housing, both of which are open at both opposed ends. The puller tube is capable of sliding displacement within and along a portion of the length of the puller housing, and is coupled to the housing by means of a guide pin, or key, to prevent relative rotation between the housing and tube. A first end of the puller tube is threaded for engaging and maintaining a puller nut on an end of the housing. The puller nut includes a threaded aperture for receiving a draw bolt which is inserted in and extends to a second opposed end of the puller housing. A second end of the puller tube includes an end flange for engaging first and second paired split jaw members each having a respective inner tapered flange on a distal end thereof for engaging the bearing's tapered, eccentric cylindrical flange. With the two split jaws engaging the bearing's inner race, the bearing housing is slid along the bearing tube so as to cover the split jaws and prevent them from becoming disengaged from the inner race's tapered, cylindrical flange. The end of the draw bolt is placed in contact with an end of the shaft and is tightened, moving the puller housing and tube as well as the pair of split jaws along the longitudinal axis of and away from the shaft and removing the bearing from the shaft. The pulling force is equally distributed over both jaws and uniformly applied about the entire circumference of the bearing's inner race. Another embodiment of the inventive bearing puller includes first and second paired half-ball race jaws for engaging the ball groove on the bearing's inner race for removing the inner bearing race from the shaft.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A bearing puller for removing a bearing from a shaft, wherein the bearing includes an outer race and an inner race disposed on said shaft, said bearing puller comprising:

an outer cylindrical hollow housing having first and second opposed, open ends;

an inner cylindrical hollow puller tube slidably disposed within said housing and moveable along a portion of the length of said housing, said puller tube including first and second opposed and open ends with said second end being externally threaded;

first and second separate rigid semi-cylindrical jaw members having the outer surfaces thereof tapered engaging the inner race of the bearing and coupled to the first end of said puller tube and disposed at least partially within and engaging a first end of said housing;

internally threaded tightening means for threaded engagement with said second end of said puller tube and engaging the second end of said housing for displacing said puller tube and jaw members toward the second end of said housing and urging said jaw members inwardly toward one another and in secure engagement with the bearing's inner race; and puller means coupled to said tightening means and engaging an end of the shaft for urging said hollow housing, puller tube and jaw members along the longitudinal axis and toward the end of the shaft for removing the bearing from the shaft, whereby the separate first and second rigid semi-cylindrical tapered jaw members accommodate bearings of different diameters and different types.

2. The bearing puller of claim 1 wherein the inner race of the bearing includes a tapered end flange and wherein each of said first and second jaw members includes a respective inner tapered flange for engaging the tapered end flange of the inner bearing race.

3. The bearing puller of claim 1 wherein the inner race of the bearing includes a ball groove about the outer periphery thereof, and wherein each of said first and second jaw members includes a respective inner flange for engaging the ball groove of said inner bearing race.

4. The bearing puller of claim 2 or 3 wherein said jaw members and the first end of said housing include tapered abutting surfaces for directing said jaw members inwardly toward one another and into more secure engagement with the bearing's inner race as said jaw members are displaced toward the second end of said housing.

5. The bearing puller of claim 2 or 3 wherein said tightening means includes a puller nut coupled to said puller tube and further including an aperture through which said puller means is inserted.

6. The bearing puller of claim 5 wherein said puller nut includes a drill hole on an outer portion thereof, and wherein said drill hole is adapted to receive a punch to facilitate tightening of said puller nut on said puller tube.

7. The bearing puller of claim 5 wherein said puller tube includes outer threads on the second end thereof and said puller nut includes inner threads coupled to the outer threads of said puller tube.

8. The bearing puller of claim 7 wherein the aperture in said puller nut is threaded and wherein said puller means includes a draw bolt threadably inserted through said aperture and having first and second opposed ends, wherein said first end engages an end of the shaft, and wherein the bearing is removed from the shaft when said draw bolt is rotated in a first direction.

9. The bearing puller of claim 8 wherein said draw bolt includes a replaceable end tip for engaging the end of the shaft.

10. The bearing puller of claim 9 wherein said replaceable end tip has either a flat end or a pointed end for engaging the end of the shaft.

11. The bearing puller of claim 2 or 3 further comprising displacement limiting means for restricting movement of said hollow puller tube to only a portion of the length of said housing.

12. The bearing puller of claim 11 wherein said displacement limiting means includes a pin coupled to and extending inwardly from said housing and an elongated linear slot disposed within and aligned along the length of said puller tube, and wherein said pin is disposed in said slot to prevent rotation and limit longitudinal displacement between said housing and puller tube.

13. A bearing puller for removing a bearing from a shaft, wherein the bearing includes an outer race and an inner race disposed on said shaft, said bearing puller comprising:

an outer cylindrical hollow housing having first and second opposed, open ends;

an inner cylindrical hollow puller tube slidably disposed within said housing and moveable along a portion of the length of said housing, said puller tube including first and second opposed, open ends and having external threads on the second end thereof;

first and second rigid semi-cylindrical jaw members having the outer surfaces thereof tapered for engaging the inner race of the bearing and coupled to the first end of said puller tube and disposed at least partially within and engaging a first end of said housing;

tightening means including an internally threaded separate puller nut having said internally threads thereof coupled to the outer threads of said puller tube and engaging the second end of said housing for displacing said puller tube and jaw members toward the second end of said housing and urging said jaw members inwardly toward one another and in secure engagement with the bearing's inner race; and puller means coupled to said puller nut through an aperture therein and engaging an end of the shaft for urging said hollow housing, puller tube and jaw members along the longitudinal axis and toward the end of the shaft for removing the bearing from the shaft.

* * * * *